No. 838,357. PATENTED DEC. 11, 1906.
J. J. ROOKUS.
FRUIT AND VEGETABLE SLICER.
APPLICATION FILED SEPT. 29, 1905.

Witnesses
Edward R. Monroe.
Georgiana Chace

Inventor
John J. Rookus
By Luther V. Moulton
Attorney

UNITED STATES PATENT OFFICE.

JOHN J. ROOKUS, OF ZEELAND, MICHIGAN, ASSIGNOR OF ONE-THIRD TO MARTIN E. VANDEN BOSCH AND ONE-THIRD TO JACOB POEST, OF ZEELAND, MICHIGAN.

FRUIT AND VEGETABLE SLICER.

No. 838,357.     Specification of Letters Patent.     Patented Dec. 11, 1906.

Application filed September 29, 1905. Serial No. 280,665.

*To all whom it may concern:*

Be it known that I, JOHN J. ROOKUS, a citizen of the United States, residing at Zeeland, in the county of Ottawa and State of Michigan, have invented certain new and useful Improvements in Fruit and Vegetable Slicers; and I do hereby declare the following to be a full, clear, and exact description of the invention, such as will enable others skilled in the art to which it appertains to make and use the same.

My invention relates to improvements in fruit and vegetable slicers; and its object is to provide a simple, cheap, and efficient device and to provide the same with various new and useful features hereinafter more fully described, and particularly pointed out in the claims, reference being had to the accompanying drawings, in which—

Figure 1:
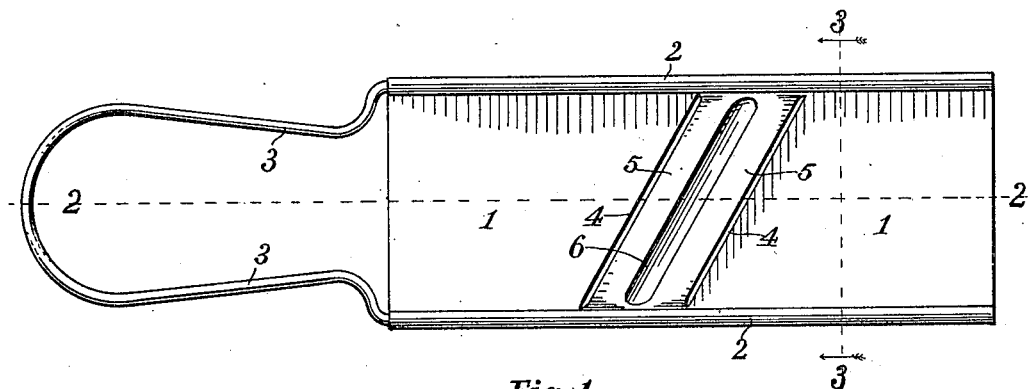
Figure 2:
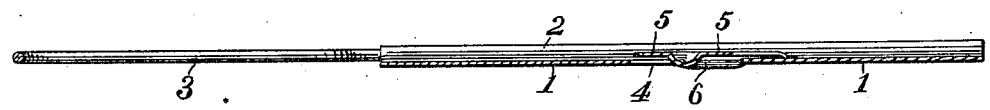
Figure 3:
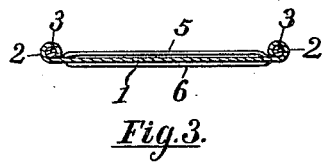

Figure 1 is a plan view of a device embodying my invention; Fig. 2, a longitudinal section of the same on the line 2 2 of Fig. 1, and Fig. 3 a transverse section of the same on the line 3 3 of Fig. 1.

Like numbers refer to like parts in all of the figures.

1 represents a flat plate of sheet metal, preferably of steel, of suitable dimensions, and having its opposite and longer edges rolled in tubular form, as at 2 2, in which are inserted the ends of a wire 3, the middle portion of which wire is bent in a loop and projects to form a suitable handle to the device, as shown. These tubular edges stiffen the plate and also furnish side guides to engage the article being sliced to guide the same and prevent it from slipping off sidewise.

The cutting member is formed by cutting diagonal slots 4 in this plate between these tubular edges, arranged parallel and spaced apart, the portion of the plate between these slots being raised above the plane of the plate and having its opposite edges sharpened to form an oppositely-acting cutting member 5. This raised portion is stiffened to maintain it in a plane above and parallel to the plane of the plate and at a sufficient distance above the same to correspond to the thickness of the slice to be cut by means of a concavo-convex middle portion 6, which portion extends downward between the cutting edges, and thus also serves to deflect the slice downward and prevent it from passing through the opposite slot.

It will be noted that the cutting member is in a plane parallel with the plate and above the same, whereby it is presented edgewise to the work, and thus does not tend to spring when cutting, and also cuts easier than if inclined to the plane of the plate.

I am thus able, by properly forming and uniting a plate of sheet metal and a piece of wire, to produce a substantial, simple, and effective double-cutting slicer at small expense and well adapted for the use intended, also to use quite thin sheet metal and at the same time provide a device that will not spring when cutting and will thus cut slices of uniform thickness.

Having thus fully described my invention, what I claim, and desire to secure by Letters Patent, is—

1. A slicer comprising a plate of sheet metal having parallel slots, the portion between the slots being raised and in a plane above and parallel with the plane of the plate, the middle of said raised portion being depressed, to strengthen the raised portion and to deflect the slices downward.

2. In a slicer a flat plate having parallel slots the portion between the slots having its side portions in a plane above and parallel with the plane of the plate, and provided with cutting edges, and its middle portion depressed in concavo-convex form.

In testimony whereof I affix my signature in presence of two witnesses.

JOHN J. ROOKUS.

Witnesses:
    CORNELIS ROOSENRAAD,
    JACOB POEST.